United States Patent
Tamiya

(10) Patent No.: US 8,171,496 B2
(45) Date of Patent: May 1, 2012

(54) PROGRAM EVALUATION PROGRAM, PROGRAM EVALUATION DEVICE, AND PROGRAM EVALUATION METHOD

(75) Inventor: Yutaka Tamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1130 days.

(21) Appl. No.: 12/020,848

(22) Filed: Jan. 28, 2008

(65) Prior Publication Data

US 2008/0184263 A1 Jul. 31, 2008

(30) Foreign Application Priority Data

Jan. 29, 2007 (JP) .................................. 2007-18052

(51) Int. Cl.
*G06F 9/44* (2006.01)
*G06F 9/45* (2006.01)

(52) U.S. Cl. ........................................ 719/315; 717/158

(58) Field of Classification Search .................... 719/315
See application file for complete search history.

(56) References Cited

U.S. PATENT DOCUMENTS

| | | | | |
|---|---|---|---|---|
| 6,205,555 | B1* | 3/2001 | Kageshima et al. | 713/300 |
| 6,820,222 | B2* | 11/2004 | Swoboda | 714/33 |
| 2002/0194511 | A1* | 12/2002 | Swoboda | 713/300 |
| 2004/0268159 | A1 | 12/2004 | Aasheim et al. | |

FOREIGN PATENT DOCUMENTS

| | | |
|---|---|---|
| JP | 2004-530976 | 10/2004 |
| JP | 2005-25754 | 1/2005 |
| WO | WO 02-079957 A3 | 10/2002 |

* cited by examiner

*Primary Examiner* — Andy Ho
*Assistant Examiner* — Abdou Seye
(74) *Attorney, Agent, or Firm* — Staas & Halsey LLP

(57) ABSTRACT

According to an aspect of an embodiment, an evaluation device for evaluating a target program is provided by calculating a first parameter showing an impact size of a target module of the target program on the outside of the target module, based on an execution log of the target program and calculating a second parameter that is a value related to a power consumption by executing the target module. An evaluator evaluates the target module based on the first and second parameters and outputs an evaluation result.

8 Claims, 18 Drawing Sheets

Fig. 2

| Module name | func1 | |
|---|---|---|
| Variable name | Variable type (external/internal) | Address range |
| a | External | 0 × 2000 to 0 × 21ff |
| b | Internal | fp (frame register) + 0 × 16 |
| (Return value) | External | gr8 (return value register) |

Fig. 3

```
<Cycle> : <effective instruction>

......

1001 : call func1

1002 : st 0×1, @(0×2004)

1003 : st 0×2, @(fp + 0×16)

1004 : mov 0×3, gr8

1005 : ret

| Module A : polling method | External impact | Power consumption |
|---|---|---|
| 1 : void f_polling (int* lock, int* count) | — | — |
| 2 : { | — | — |
| 3 :   while (1) { | — | — |
| 4 :     int val = 1 ; | 0 | 10 |
| 5 :     swap(*lock, val) ; | 0 | 10 |
| 6 :     if (val == 0)//Lock acquirement check | 0 | 10 |
| 7 :       break; //Successfully acquired | — | — |
| 8 :   } | 1 | 1 |
| 9 :   ++ (*count) ; | 1 | — |
| 10 : } | | |
| Total | 1 | 41 |
| Power efficiency = 1/41 = 2.4% | | |

Fig. 7

| Module B : interrupt method | External impact | Power consumption |
|---|---|---|
| 1 : void f_interrupt (int* lock, int* count) | — | — |
| 2 : { | — | — |
| 3 : while (1) { | — | — |
| 4 : int val = 1 ; | 0 | 2 |
| 5 : swap(*lock, val) ; | 0 | 2 |
| 6 : if (val == 0)//Lock acquirement check | 0 | 2 |
| 7 : wait_for_interrupt() ; //Failed | — | 1 |
| 8 : } | — | — |
| 9 : ++ (*count) ; | 1 | 1 |
| 10 : } | | |
| Total | 1 | 8 |
| Power efficiency = 1/8 = 12.5% | | |

Fig. 8

| Module name | Module B |
|---|---|
| External impact | 1 |
| Power consumption | 8 |
| Power efficiency | 1/8 |

Fig. 12

| Module name | func1 | |
|---|---|---|
| Variable name | External impact | Comment |
| a | 2 | Impact is medium because of being referred twice from others |
| error | 10 | Impact is high because of error notification |
| (Return value) | 1 | Impact is low |

Fig. 15

| Module name | Module B | | |
|---|---|---|---|
| | Total | Self | Child |
| External impact | 1 | 1 | 0 |
| Power consumption | 8 | 7 | 1 |
| Power efficiency | 1/8 | 1/7 | 0/1 |

Fig. 17

| Cycle | Instruction address | Effective instruction | Target address |
|---|---|---|---|
| ..... | ..... | ..... | ..... |
| 1001 | 0×00A0 | call func1 | – |
| 1002 | 0×00A4 | st 0×1, @(0×2004) | 0×2004 |
| 1003 | 0×00A8 | st 0×2, @(fp + 0×16) | 0×1016<br>fp=0×1000 |
| 1004 | 0×00AC | mov 0×3, gr8 | gr8 |
| 1005 | 0×00B0 | ret | – |
| ..... | ..... | ..... | ..... |
| 2001 | 0×00A0 | call func1 | – |
| 2002 | 0×00A4 | st 0×1, @(0×2004) | 0×2004 |
| 2003 | 0×00A8 | st 0×2, @(fp + 0×16) | 0×3016<br>fp=0×3000 |
| 2004 | 0×00AC | mov 0×3, gr8 | gr8 |
| 2005 | 0×00B0 | ret | – |

Fig. 18

| Cycle | Instruction address | Effective instruction | Number of write to outside |
|---|---|---|---|
| ..... | ..... | ..... | .... |
| 1001 | 0×00A0 | call func1 | – |
| 1002 | 0×00A4 | st 0×1, @(0×2004) | 1 |
| 1003 | 0×00A8 | st 0×2, @(fp + 0×16) | 0 |
| 1004 | 0×00AC | mov 0×3, gr8 | 1 |
| 1005 | 0×00B0 | ret | – |
| ..... | ..... | ..... | .... |
| 2001 | 0×00A0 | call func1 | – |
| 2002 | 0×00A4 | st 0×1, @(0×2004) | 1 |
| 2003 | 0×00A8 | st 0×2, @(fp + 0×16) | 0 |
| 2004 | 0×00AC | mov 0×3, gr8 | 1 |
| 2005 | 0×00B0 | ret | – |

PROGRAM EVALUATION PROGRAM, PROGRAM EVALUATION DEVICE, AND PROGRAM EVALUATION METHOD

CROSS-REFERENCE TO RELATED APPLICATIONS

This application is based upon and claims the benefit of priority from the prior Japanese Patent Application No. 2007-18052 filed on Jan. 29, 2007, the entire contents of which are incorporated herein by reference.

BACKGROUND

1. Field

The embodiments relate to an evaluation program for a program that evaluates a program, an evaluation device for a program, and an evaluation method for a program.

SUMMARY

According to an aspect of an embodiment, an evaluation device for evaluating an evaluation target program, the evaluation device for a program including a first calculation section to calculate a first parameter that is a value to show the impact size of a target module that is a module in the evaluation target program on the outside of the target module based on an execution log of the evaluation target program; a second calculation section that calculates a second parameter that is a value related to a power consumption by executing the target module, and an evaluation section that evaluates the target module based on the first and second parameters and outputs the evaluation result.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 illustrates a table to show one example of the external variable information table of embodiment 1;

FIG. 3 illustrates a figure to show one example of the execution log of embodiment 1;

FIG. 6 illustrates a figure to show one example of power efficiency calculation result of module A according to embodiment 1;

FIG. 7 illustrates a figure to show one example of power efficiency calculation result of module B according to embodiment 1;

FIG. 8 illustrates a figure to show one example of the power profile of embodiment 1;

FIG. 12 illustrates a table to show one example of the external impact table of embodiment 3;

FIG. 15 illustrates a figure to show one example of power efficiency calculation result of module B of embodiment 4;

FIG. 17 illustrates a figure to show one example of the execution log output by a conventional debugger;

FIG. 18 illustrates a figure to show one example of the execution log output by the debugger of embodiment 5.

DETAILED DESCRIPTION OF THE EMBODIMENTS

There are preferred embodiments of the present invention explained in the following with reference to the accompanying drawings.

Embodiment 1

In the present embodiment, a program evaluation device (an evaluation device for a program) that calculates the power efficiency of each module in the evaluation target program, which is a program to be a target for evaluation, is explained.

Figure 1:
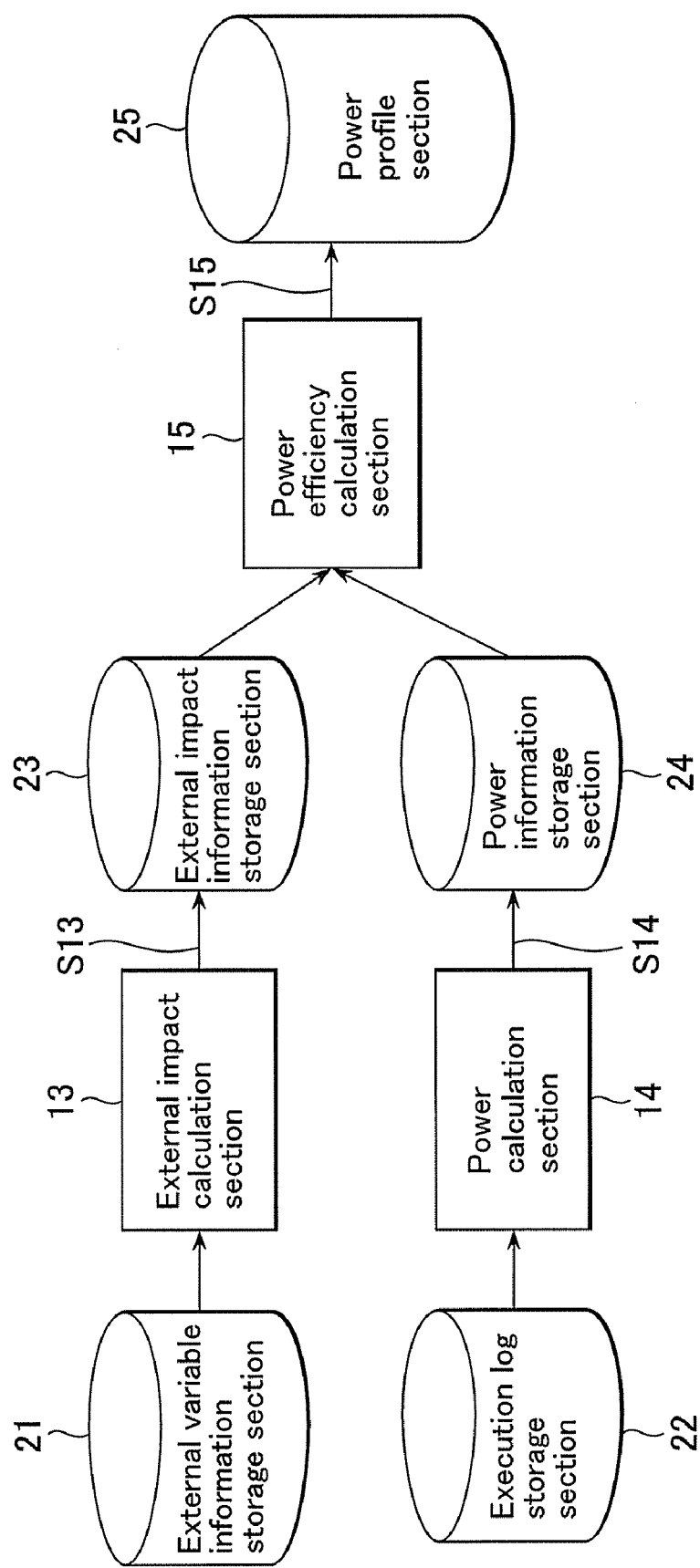
FIG. 1 illustrates a block diagram to show one example of the configuration of a program evaluation device of embodiment 1.

FIG. 1 illustrates a block diagram to show one example of the configuration of the program evaluation device of the present embodiment. This program evaluation device is realized by an information processor (computer or computing device or programmed controller). In addition, this program evaluation device comprises an external impact calculation section 13 that is realized in the control section of the information processor, power calculation section 14, power efficiency calculation section 15, external variable information storage 21 that is realized in the storage of the information processor, execution log storage 22, external impact storage 23, power information storage 24, and power profile storage 25.

Overview of the operation of the program evaluation device of the present embodiment.

(S13) External impact calculation: the external impact calculation section 13 calculates the external impact (the first parameter) of the target module based on the external variable information table of the target module saved in the external variable information storage 21 and the execution log of the target module saved in the execution log 22. Then, the external impact calculation section 13 is saved in the external impact information storage 23 as external impact information.

(S14) Power calculation: the power calculation section 14 calculates the power consumption (the second parameter) of the target module based on the power consumption per previously set instruction type and the execution log saved in the execution log storage 22. Then the power calculation section 14 saves it in the power information storage 24 as power information.

(S15) Power efficiency calculation: the power efficiency calculation section 15 calculates the power efficiency (evaluation results) of the target module based on the external impact information saved in the external impact information storage 23 and the power information saved in the power information storage 24. Then, the power efficiency calculation section 15 saves it in the power profile storage 25 as a power profile.

Explanation of the external impact calculation

The external variable information table of the target module is information used to determine whether the variable is an external variable or not, and is previously set based on any criteria, for example, a specification of the evaluation target program. In one example embodiment, the internal variable can refer to the variable used only in the target module. In addition, in the example embodiment, the external variable can refer to a variable other than the internal variable (in this case a variable used outside of the target module).

FIG. 2 illustrates a table to show one example of the external variable information table of the present embodiment. In the external information table of one module, a module name as well as a variable name, variable type and address range are recorded per variable in the module. As variable types, there is an external variable or an internal variable. This example is about the external variable information table of module func1. According to this external variable information table, a variable 'a' is determined as an external variable when the reference destination (target address) is within the address range, a variable 'b' is determined as an internal variable, and a return value is determined as an external variable.

The execution log of the evaluation target program is previously generated by an external debugger and is saved in the execution log storage 22. FIG. 3 illustrates a figure to show one example of the execution log of the present embodiment. To this execution log, the cycle number and execution instruction are recorded. In addition, it is also possible that the program evaluation device comprises a debugger and the debugger creates the execution log of the evaluation target and saves it in the execution log storage 22.

The external impact is calculated per module. A given external impact is applied to a read or write outside of the module such as the load instruction and store instruction of the external variable. In the present embodiment, for example, an external impact is added to only a write to the external module. The external impact calculation section 13 initializes the external impact per module to 0 before the external impact calculation.

Figure 4:
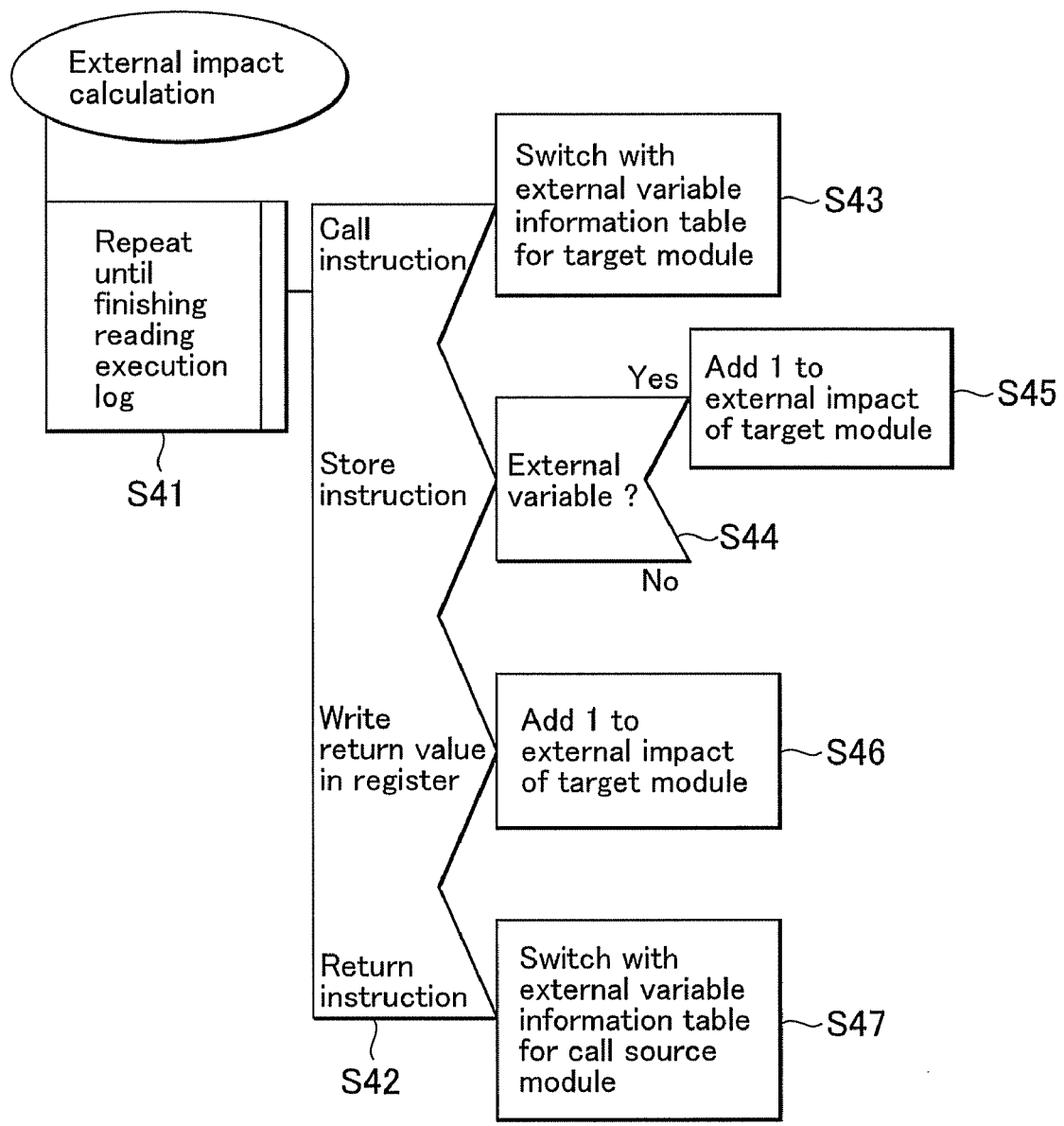
FIG. 4 illustrates a Problem Analysis Diagram (PAD) to show one example of the external impact calculation of embodiment 1.

FIG. 4 illustrates a PAD to show one example of the external impact calculation of the present embodiment. A PAD (Problem Analysis Diagram) is a figure to show a flow of the program similarly to a flow chart. The symbol of processing (functions) S41 means repetition and repeats the processing of the symbols (functions) to the right up to the given condition. The symbol of processing S42 means selection, for example, module instruction selection, and advances to the processing of the right side symbols of corresponding conditions. The symbol of processing S43 means normal processing and advances to the processing of the lower symbols after execution. When there are no lower symbols, the repetition procession is repeated.

(S41) The external impact calculation section 13 reads the execution instruction per cycle from the execution log, executes the processing S42 and repeats the processing S42 until it finishes reading the execution log.

(S42) The external impact calculation section 13 determines the read execution instruction.

(S43) When the execution instruction is the call instruction (S42, call instruction), the external impact calculation section 13 switches the target module with the call destination module as well as the external variable information table with that of the target module to refer to.

(S44) When the execution instruction is the store instruction (S42, store instruction), the external impact calculation section 13 determines whether the variable of the store instruction is an external variable or not based on the external variable information table.

(S45) When the variable of the store instruction is an external variable (S44, yes), the external impact calculation section 13 adds 1 to the external impact of the target module.

(S46) When the execution instruction is a write of the return value to the register (S42, a write of the return value to the register), the external impact calculation section 13 adds 1 to the external impact of the target module.

(S47) When the execution instruction is the return instruction (S42, return instruction), the external impact calculation section 13 switches the target module with the call source module as well as the external variable information table with that of the target module to refer to.

Figure 5:
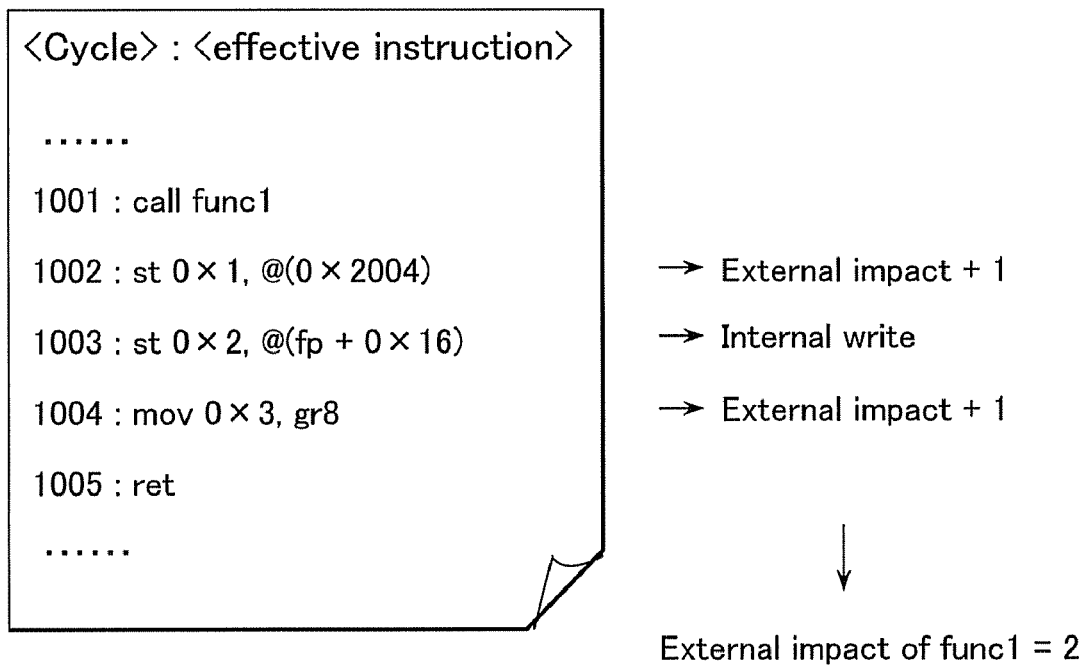
FIG. 5 illustrates a conceptual diagram to show one example of the external impact calculation based upon an example execution log according to embodiment 1.

FIG. 5 illustrates a conceptual diagram to show one example of the external impact calculation based upon an example execution log according to an embodiment. The execution log in the figure is similar to that in FIG. 3, and means the execution of the module func1. First of all, the external impact of the module func1 is initialized to 0. Because the cycle 1001 is a call (call instruction) of the module func1, the target module becomes the module func1. Because the cycle 1002 is a write (store instruction) to the external variable, 1 is added to the external impact of the module func1. Because the cycle 1003 is a write (store instruction) to the internal variable, the external impact to the module func1 is unchanged. Because the cycle 1004 is a write of the return value to the register, 1 is added to the external impact of the module func1. Because the cycle 1005 is the return instruction, the target module becomes the call source module. As a result, the external impact of the module func1 becomes 2.

In addition, in the present embodiment, it was described that the external impact was added only to a write to outside of the module, though it is also possible to add the external impact to a read from the outside of the module depending on the module function, for example, when an input to the module is important.

According to the above-mentioned external calculation, the processing amount of instructions that are necessary for the evaluation target program can be acquired.

Explanation of the power calculation

The power calculation section 14 calculates the power consumption per module based on the power consumption and execution log per given instruction type. In this embodiment, the power calculation section 14 totals the power consumption in the module, because the power consumption of 1 operation instruction in the execution log is 1.

According to the above-mentioned power calculation, power consumption of each module in the evaluation target program can be acquired.

Explanation of power efficiency calculation

The power efficiency calculation section 15 calculates the power efficiency per module from the external impact and power consumption per module and profiles the power efficiency per module altogether. Here, the power efficiency of the target module is defined as follows:

Power efficiency of target module=(External impact of target module)÷(Power consumption of target module)

Here, the concrete example of the power efficiency calculation result is described. The evaluation target program here is a module that has a function to increment variable "*count"

after acquiring lock variable '*lock' under the multi-thread execution environment. In addition, here, modules A and B are prepared as two types of evaluation target programs having the same function.

FIG. 6 illustrates a figure to show one example of the power efficiency calculation result of the module A according to the present embodiment. This figure shows the source of the module A line by line, and shows the external impact and power consumption per line. The module A is a module that realized the above-mentioned function by the polling method. Here, it is assumed that the module A continuously tried to acquire lock and acquired the lock on the tenth try.

FIG. 7 illustrates a figure to show one example of the power efficiency calculation result of the module B of the present embodiment. This figure shows the source of the module B line by line, and shows the external impact and power consumption per line. The module B is a module that realized the above-mentioned function by the interrupt method. Here, the module B sleeps at wait_for_interrupt( ) after it fails in lock acquisition, wakes up by an interrupt that notifies unlocking, and it acquires the lock.

In the modules A and B, the external impact is only a write to the external variable *count, and the external impact calculation section 13 calculates the external impact by counting the number of writes to external variable *count. The local variable 'val' and lock variable *lock are internal variables, and they have nothing to do with the external impact. In addition, the power calculation section 14 regards the power consumption for 1 calculation instruction as 1.

External impacts of modules A and B become 1 by the external impact calculation. By power calculation, the power consumption of the module A becomes 41 and the power consumption of the module B becomes 8. The power efficiency of the module A becomes $1/41=2.4\%$ by the power efficiency calculation, and the power efficiency of the module B becomes $1/8=12.5\%$. In addition, it can be determined that the power efficiency of the module B is larger than the power efficiency of the module A.

In addition, the power efficiency calculation section 15 can compare plural modules as mentioned above in terms of external impact, power consumption and power efficiency, and output the comparison results.

FIG. 8 illustrates a figure to show one example of the power profile of the present embodiment. This figure shows the power profile of the above-mentioned module B. Values of such as module name, external impact, power consumption and power efficiency are recorded in the power profile. In the power profile, neither the external impact nor power consumption has to be recorded, but only the power efficiency may be recorded.

With the above-mentioned external impact calculation, it is possible to calculate the size of the external impact per unit power consumption as power efficiency for each target module of a target program and based thereon the evaluation target program can be evaluated and compared by the power efficiency. With the power efficiency, it is possible to determine whether the power consumption of a target module and/or target program is effectively used in relation to other modules, other programs, other information processor components, or computing environment external to the target module and/or target program, or any combinations thereof, or to determine whether the power consumption of the target module and/or target program is effectively used to the outside of the target program and/or to the outside of the target module (as the case may be).

Embodiment 2

In the present embodiment, a program evaluation device that extracts the external variable from the evaluation target program is described.

Figure 9:
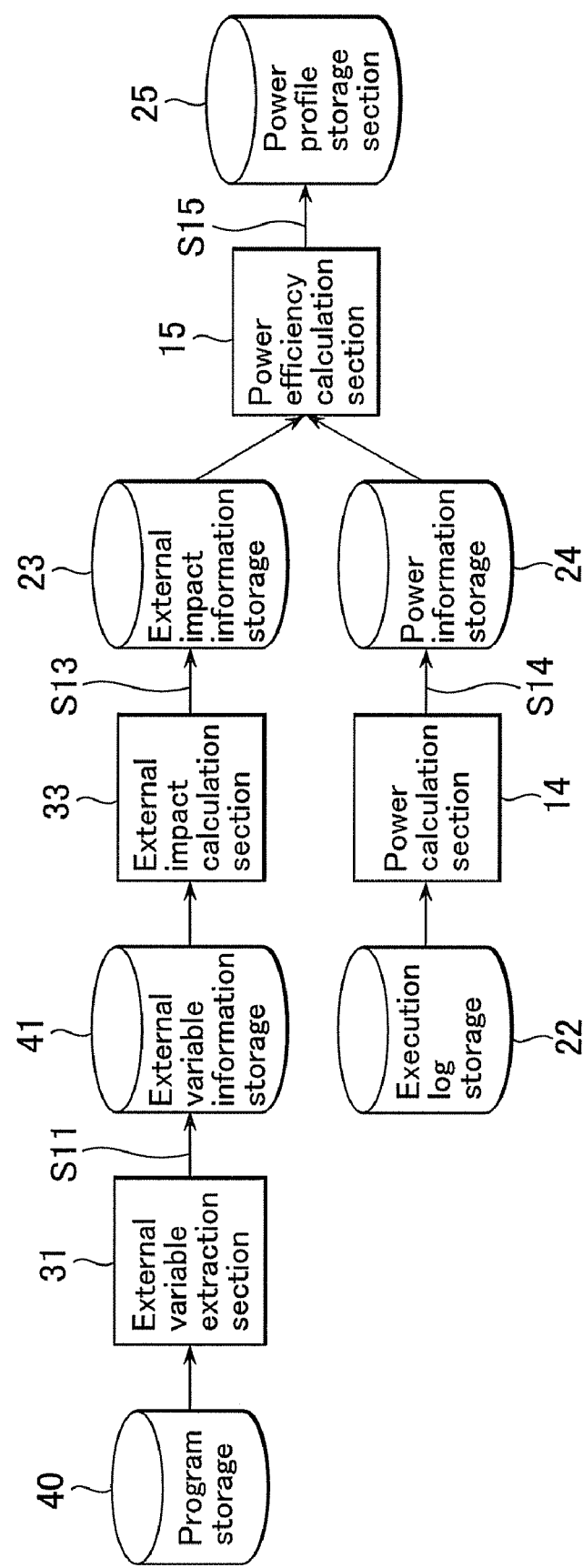
FIG. 9 illustrates a block diagram to show one example of the configuration of the program evaluation device of embodiment 2.

FIG. 9 illustrates a block diagram to show one example of the configuration of the program evaluation device of the present embodiment is shown. In this figure, the same reference numbers as FIG. 1 refer to the same or equivalent objects in FIG. 1, and the explanation about them is omitted here. Comparing with FIG. 1, this FIG. 9 comprises an external variable extraction section 31 that is realized in the control section of the information processor, a program storage section 40 that is realized in the storage section of the information processor, an external impact calculation section 33 instead of the external impact calculation section 13, and the external variable information storage section 41 instead of the external variable information storage 21.

Overview of the operation of the program evaluation device of the present embodiment.

(S11) The external variable extraction: the external variable extraction 31 extracts an external variable from the source of the evaluation target program saved in the program storage 40, and saves it in the external variable information storage 41 as an external variable information table.

(S13) The external impact calculation: the external impact calculation section 33 calculates the external impact based on the external variable information table saved in the external variable information storage 41 and the execution log of the evaluation target program saved in the execution log storage 22, and saves it in the external impact information storage 23 as external impact information.

It is similar to embodiment 1 after processing S14.

Explanation of the external variable extraction

The external variable extraction can be realized, for example, by using the source analysis technique of the compiler. In addition, the external variable extraction is performed per module in the evaluation target program. For example, an internal variable can be a variable used only in the module. For example, an external variable can be a variable used outside of the module. In the present embodiment, the evaluation target program is a C program source.

Figure 10:
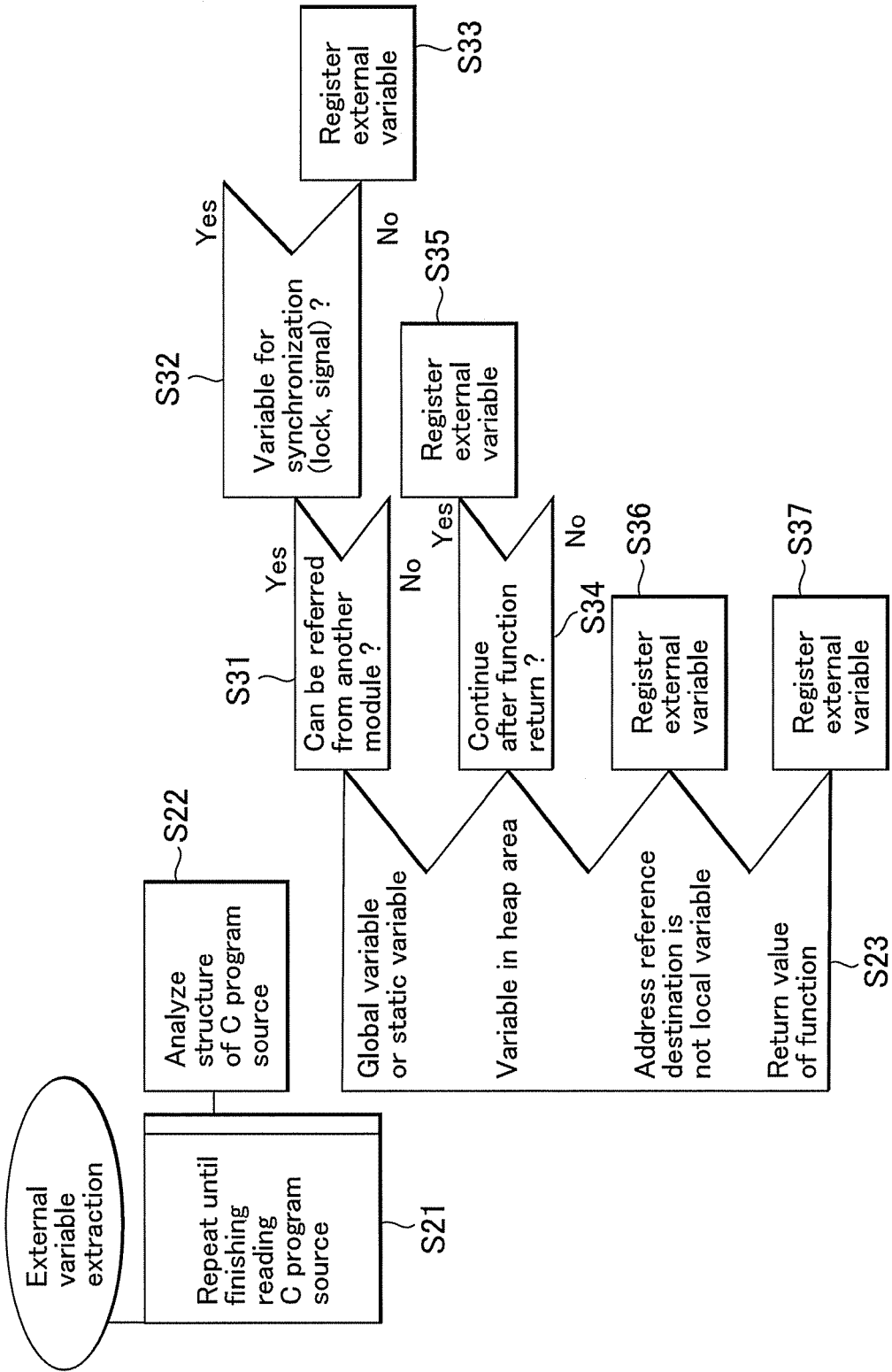
FIG. 10 illustrates a PAD to show one example of the operation of the external variable extraction of embodiment 2.

FIG. 10 illustrates a PAD that shows one example of operation the external variable extraction of the present embodiment.

(S21) The external variable extraction section 31 reads C program source per section, processes S22, and repeats processing S22 until it finishes reading the C program source.

(S22) The external variable extraction section 31 performs configuration analysis of the C program source, extracts the variable, makes it as a target variable, and shifts to the processing S23.

(S23) The external variable extraction section 31 determines the target variable.

(S31) When the target variable is a global variable or a static variable (S23, global variable or static variable), the external variable extraction section 31 determines whether the target variable can be referred to from another module.

(S32) When the target module can be referred to from another module (S31, yes), the external variable extraction section 31 determines whether the target variable is a variable for synchronization (lock, signal).

(S33) When the target variable is a variable for synchronization (S32, no), the external variable extraction section 31 performs the external variable registration.

(S34) When the target variable is a variable in a heap area (S23, a variable in a heap area), the external variable extraction section 31 determines whether the target variable exists after the return of function or not.

(S35) When the variable exists after the return of function (S34, yes), the external variable extraction section 31 performs the external variable registration.

(S36) When the address reference destination of the target variable is not a local variable (S23, the address reference destination is not a local variable), the external variable extraction section 31 performs the external variable registration of the target variable.

(S37) When the variable is a return value of a function (S23, a return value of a function), the external variable extraction section 31 performs the external variable registration of the target variable.

According to an aspect of an embodiment, any combination of the described criteria herein, for example, S31 through 37, or any other criteria according to application can be used to determine whether a target variable is external or internal.

Explanation of the external variable registration

Figure 11:
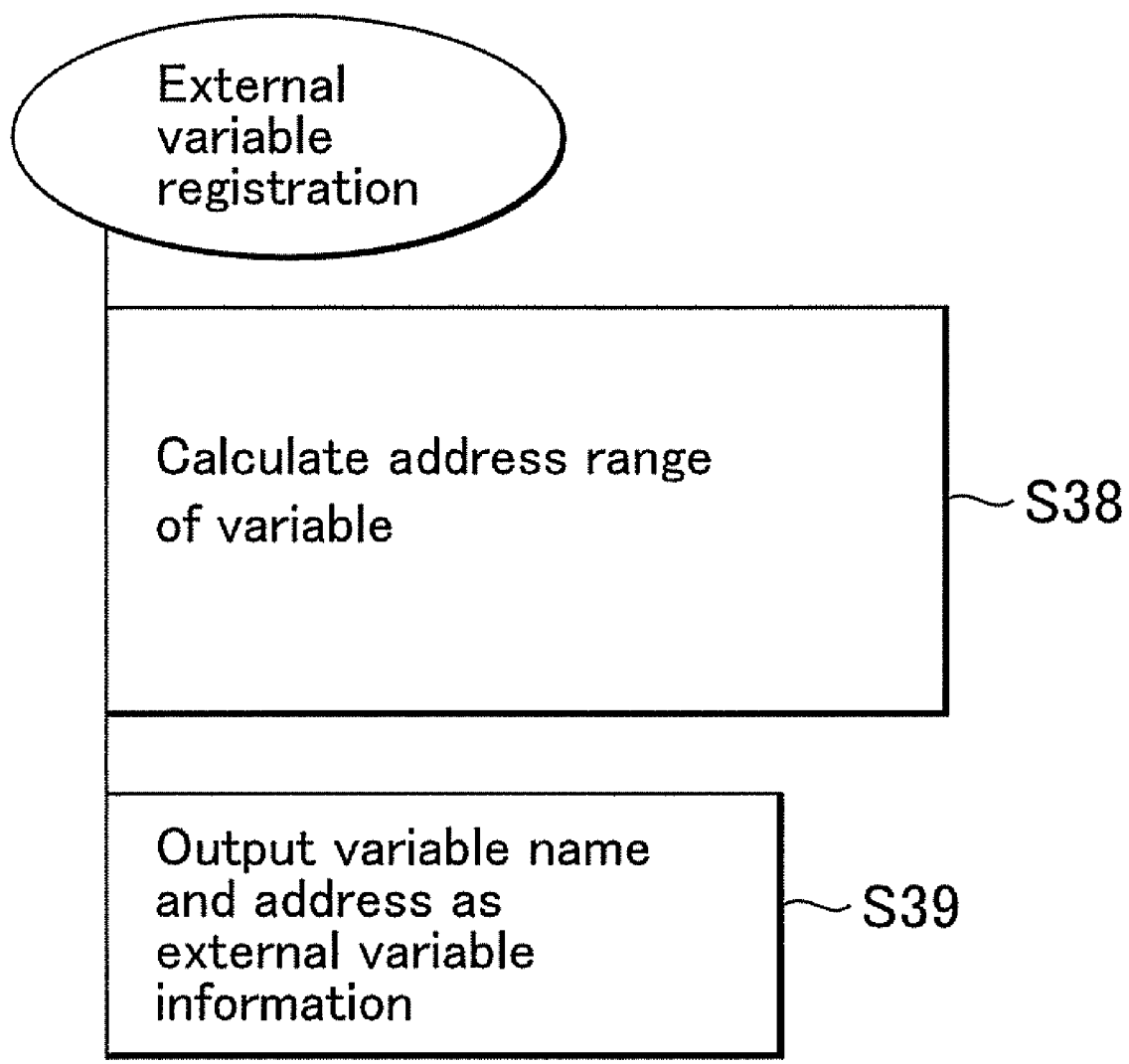
FIG. 11 illustrates a PAD to show one example of the operation of the external variable registration of embodiment 2.

FIG. 11 illustrates a PAD to show one example of the external variable registration of the present embodiment.

(S38) The external variable extraction section 31 calculates the range of the address of the target variable. Here, the variable in the stack is described as an offset address from a stack register and a frame pointer.

(S39) The variable name and address of the target variable are output per module as the external variable information table.

With the above-mentioned external variable extraction, a variable that impacts outside of a module can be automatically extracted.

Embodiment 3

In the present embodiment, the program evaluation device that calculates the external impact based on the weight per variable is explained.

The configuration and operation overview of the program evaluation device of the present embodiment are similar to Embodiment 1, however the external impact calculation is different.

Explanation of the external impact calculation

The weight of the external impact is set to the external variable saved in the external variable information storage 21 beforehand, and is saved in the external variable information storage 21 as the external impact table.

FIG. 12 illustrates a table to show one example of the external impact table of the present embodiment. This example is the external impact table of the module func1, and the external impact of variable 'a,' variable 'error,' and return value is set. Since the variable 'a' is referred to from others twice, the external impact is set as 2. Because the variable error is an error notification, the external impact is set as 10. The external impact of the return value is set as 1. In addition, it is also possible to set variable types based upon criteria, such as reference frequency, error notification, return value, and to set the external impact per variable type as the external impact table. According to an aspect of an embodiment, the external impact weight can be determined as low, medium, high, or any combinations thereof, according to any application criteria.

Figure 13:
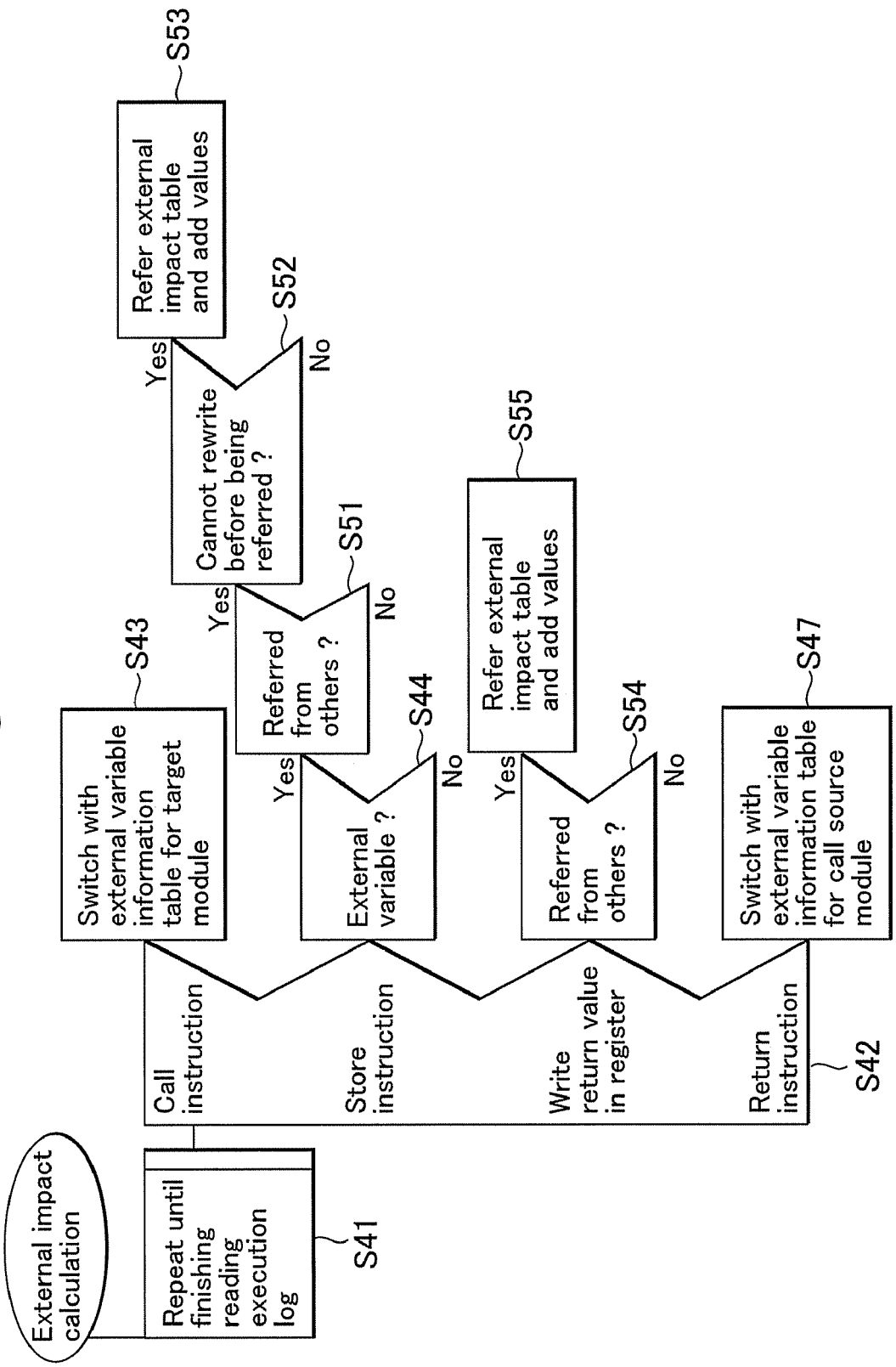
FIG. 13 illustrates a PAD to show one example of the operation of the external impact calculation of embodiment 3.

FIG. 13 illustrates PAD to show one example of the operation of the external impact calculation of the present embodiment. In this figure, the same reference numbers as FIG. 4 refer to the same or equivalent processing in FIG. 4, and the explanation about them is omitted here. Comparing with FIG. 4, as for this figure, the processing S51 is executed instead of the processing S45, and the processing S54 is executed instead of the processing S46.

(S51) In the processing S44, if the variable of the store instruction is an external variable (S44, yes), the external impact calculation section 13 regards the external variable as the target variable and determines whether the external variable is referred to from others or not.

(S52) When the target variable is referred to from others (S51, yes), the external impact calculation section 13 determines whether the target variable is rewritten before being referred to or not.

(S53) When the target variable is not rewritten before being referred to (S52, yes), the external impact calculation section 13 refers to the external impact table and adds the external impact corresponding to the target variable to the external impact of the target module.

(S54) In the processing S42, when the execution instruction is a write to the return value register (S42, a write to the return value register), the external impact calculation section 13 regards the external variable as a target variable, and determines whether the target variable is referred to from others or not.

(S55) When the target variable is referred to from others (S54, yes), the external impact calculation section 13 refers to the external impact table and adds the external impact corresponding to the target variable to the external impact of the target module.

With this external impact calculation, actual impact on the outside can be shown better by giving the external impact according to the weight per variable set beforehand.

Embodiment 4

In the present embodiment, the program evaluation device that uses the call relations between modules is described.

The configuration and overview of the operation of the program evaluation device of the present embodiment are similar to Embodiment 1, though they are different in the external impact calculation, power calculation and power efficiency calculation.

Explanation of the external impact calculation

Figure 14:
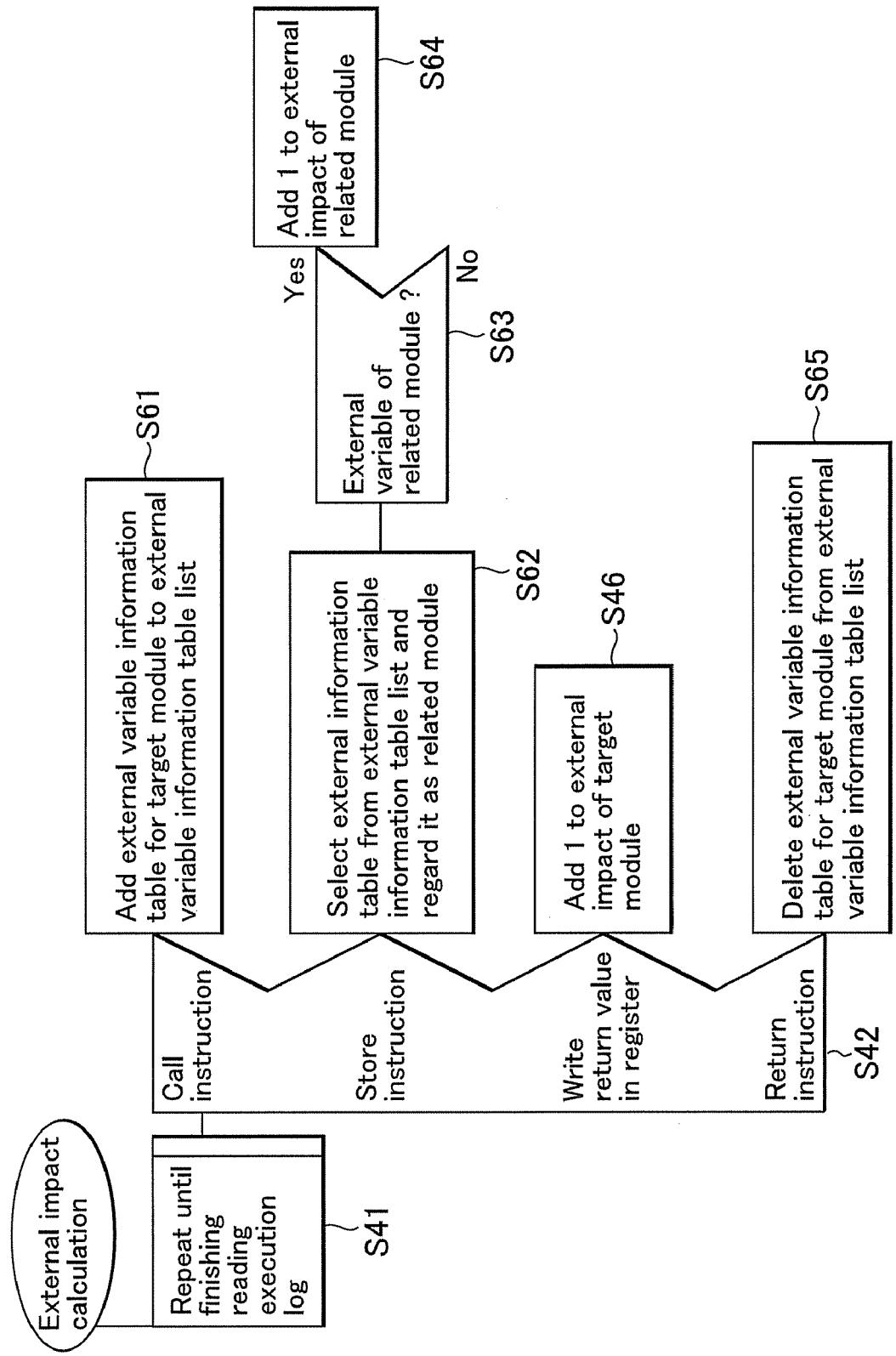
FIG. 14 illustrates a PAD to show one example of the operation of the external impact calculation of embodiment 4.

FIG. 14 illustrates PAD to show one example of the operation of the external impact calculation of the present embodiment. In this figure, the same reference numbers as FIG. 4 refer to the same or equivalent processing in FIG. 4, and the explanation about them is omitted here. In this figure, by comparing with FIG. 4, the processing S61 is executed instead of the processing S43, the processing S62 is executed instead of the processing S44, the processing S65 is executed instead of the processing S47. The external impact section 13 initializes the external impact per module before the external impact calculation and initializes the external variable information table list.

(S61) When the effective instruction is a call instruction (S42 and call instruction) in processing S42, the external impact calculation section 13 adds the external variable information table for the target module to the external variable information table list.

(S62) In the processing S42, when the effective instruction is a store instruction (S42, store instruction), the external impact calculation section 13 selects the external variable information table from the external variable information table list one by one, assumes the module of the selected external variable information table as a related module, and performs the processing S63. Thereafter, the external impact calculation section 13 repeats the process for all the external variable information tables in the external variable information table list. Here, a related module contains a high-ranking module of the target module in the target module and relating the call.

(S63) The external impact calculation section 13 determines whether the variable of the store instruction is an external variable of a related module.

(S64) When the variable of the store instruction is an external value of the related module (S63, yes), the external impact calculation section 13 adds 1 to the external impact of the related module.

(S65) In the processing S42, when the effective instruction is a return instruction (S42, return instruction), the external impact calculation section 13 deletes the external variable information table for the target module from the external variable information table list.

In this external impact calculation, the external impact calculation section 13 holds the target module and the external variable information table of the low order hierarchical module (submodule) called by the module as a list.

As a result, the external impact calculation section 13, in a similar way to Embodiment 1, calculates the entire external impact including the target module and the low order hierarchical module called by the target module as well as the external impact only of the target module and the external impact only of the low order hierarchical module.

Explanation of the power calculation

The power calculation section 14, in a similar way to the external impact calculation, and in a similar way to Embodiment 1, calculates the power consumption of the entire target module including the target module and the low order hierarchical module called by the target module, as well as the power consumption of only the target module and the power consumption of only the low order hierarchical module.

Explanation of the power efficiency calculation

The power efficiency calculation section 15, from the results of the external impact calculation and power calculation, in a similar way to Embodiment 1, calculates the power efficiency of the entire target module including the target module and the low order hierarchical module called by the target module, as well as the power efficiency of only the target module and the power efficiency of only the low order hierarchical module.

FIG. 15 illustrates a figure to show one example of the power efficiency calculation result of the module B of the present embodiment. This power efficiency calculation result shows such as external impact, power consumption and power efficiency. These values are calculated regarding the entire target module (Total), only the target module (Self) and only the low order hierarchical module (Child) respectively.

By this power efficiency calculation, it is possible to detect the case where power is consumed only for the communication between submodules and no substantial work is performed.

Embodiment 5

In the present embodiment, the program evaluation device in which a debugger 12 determines the external variable is explained.

First of all, the configuration of the program evaluation device of the present embodiment is explained.

Figure 16:
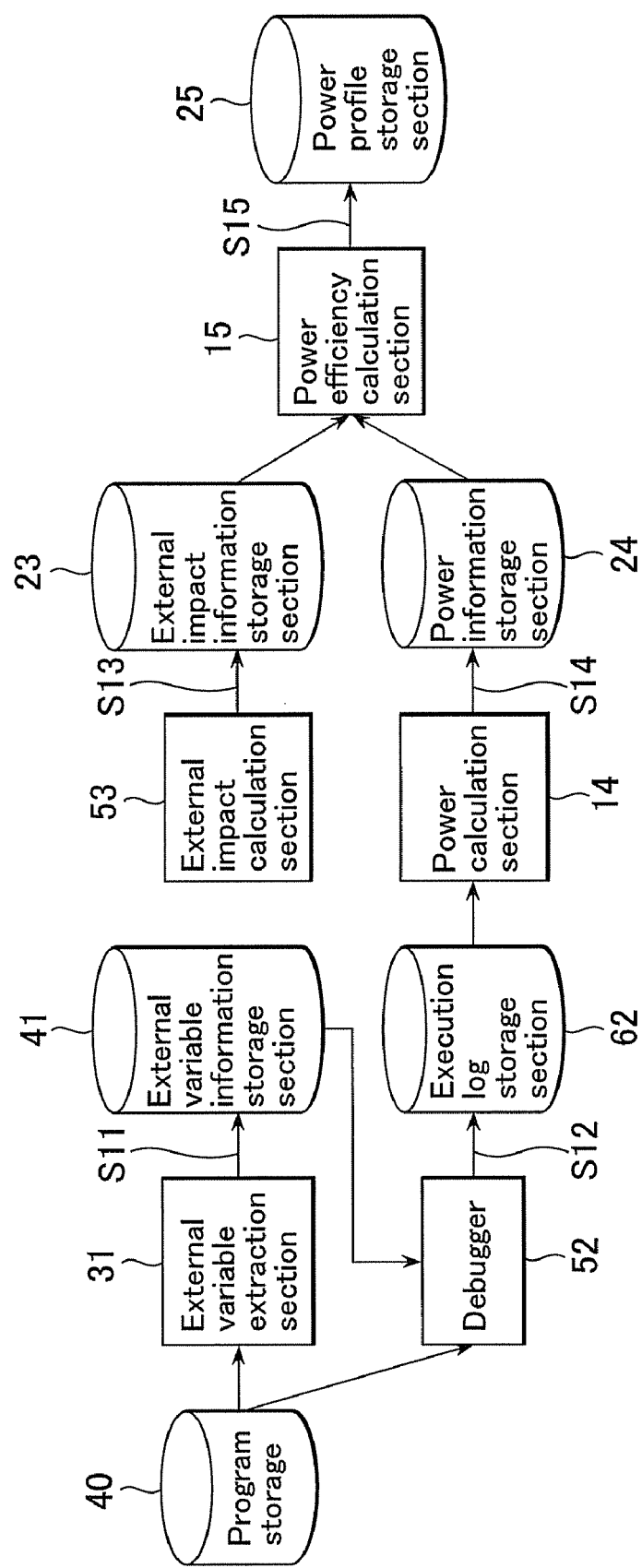
FIG. 16 illustrates a block diagram to show one example of the configuration of the program evaluation device of embodiment 5.

FIG. 16 illustrates a block diagram to show one example of the configuration of the program evaluation device of the present embodiment. In this figure, the same reference numbers as FIG. 9 refer to the same or equivalent objects in FIG. 9, and the explanation about them is omitted here. Comparing with FIG. 9, this figure comprises a debugger 52 that is newly realized in the control section of the information processor, external impact calculation section 53 instead of the external impact calculation section 33, and an execution log storage 62 instead of the execution log storage 22.

Explanation of the operation overview of the program evaluation device of the present embodiment First of all, the processing S11 similar to Embodiment 2 is performed.

(S12) The debugger 52 generates the execution log by executing the evaluation target program saved in the program storage 40, and performs the execution log generation to be saved in the execution log storage 62.

(S13) The external impact calculation section 53 calculates the external impact based on the execution log saved in the execution log storage section 62, and performs the external impact calculation to be saved in the external impact information storage 23 as external impact information.

After the processing S14 is similar to Embodiment 1.

Explanation of the execution log generation

When a conventional debugger is applied, it might be necessary to output the target address per write to the memory to the execution log. FIG. 17 illustrates a figure to show one example of the execution log output from the conventional debugger. To this execution log, a cycle number, instruction address, execution instruction, and target address are recorded per cycle. However, there is a problem that the execution log size could become large and it takes time if all the target addresses are output to the execution log.

On the other hand, the debugger 52, counts and records an instruction to the execution log if it is determined that the execution instruction is a read or write of the external variable based on the acquired execution instruction, target address and external variable information table of the external variable information storage 41. For example, the debugger 52 in this embodiment counts only a write of the external variable.

FIG. 18 illustrates a figure to show one example of the execution log output from the debugger of the present embodiment. Comparing with the above-mentioned conventional execution log, this execution log records the number of writes to the outside of the module instead of the target address. The size of the execution log can be suppressed by this debugger 52.

Explanation of the external impact calculation

The external impact calculation section 53 performs similar external impact calculation to the embodiment 1, though it records the number of writes to the outside in the execution log, it does not need to determine whether it is an external variable or not by using the external variable information table.

By this execution log generation and external impact calculation, it is possible to reduce the load of the external impact calculation and improve the efficiency of the entire program evaluation device by the debugger's detecting the section that impacts the outside of the module.

In addition, the first calculation corresponds to the external impact calculation in the embodiment. In addition, the second calculation corresponds to the power calculation in the embodiment. In addition, the evaluation corresponds to the power efficiency calculation in the embodiment. In addition, the extraction corresponds to the external variable extraction in the embodiment. In addition, the execution corresponds to the execution log generation in the embodiment.

In addition, the first calculation section corresponds to the external impact calculation section in the embodiment. In addition, the second calculation section corresponds to the power calculation section in the embodiment. In addition, the evaluation section corresponds to the power efficiency calculation section in the embodiment. In addition, the extraction section corresponds to the external variable extraction section in the embodiment. In addition, the execution of the evaluation target program corresponds to the debugger in the embodiment.

In addition, the evaluation device for the program of the present embodiment can be easily applied to the information processor, and can improve the performance of the information processor more. Here, for example, a PC (Personal Computer), a server, and a work station, etc. may be the information processor. The embodiments may be implemented in software and/or computing hardware.

In addition, it is possible to provide the program that executes each operation mentioned above in the computer that comprises the evaluation device for the program as an evaluation program of the program. The above-mentioned program can be executed by the computer that comprises the evaluation device for the program by storing the program to the computer readable media including computer readable recording media and communication media. Here, as recording media that are readable by the above-mentioned computer, internal storages, such as ROM and RAM internally mounted in the computer, portable storage media such as CD-ROM, flexible disk, DVD disk, optical disk and IC card, data bases that retain computer programs, or another computer, its database, are included. Communication media as computer readable media include transmission media (carrier waves) on lines.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer readable recording medium storing a program evaluation program for making a computer evaluate an evaluation target program according to operations comprising:
    extracting an external variable used by a target module of the evaluation target program;
    calculating a first parameter indicating an impact of the target module of the evaluation target program has on outside of the target module, based on an execution log of the evaluation target program;
    calculating a second parameter regarding a power consumption by executing the target module based on the execution log;
    evaluating the evaluation target module based on the first and the second parameters; and
    outputting an evaluation result,
    wherein the execution log is generated by:
        acquiring a target address per instruction by executing the evaluation target program before the calculation of the first parameter,
        detecting an instruction of writing or reading the external variable based on the instruction and a condition of the external variable set as the target address of the instruction, and
        generating the execution log including the detection of the writing or reading to the external variable, and
    the calculating of the first parameter accumulates a given additional value per a write or read instruction of the external variable and sets an accumulation result as the first parameter of the target module.

2. The computer readable recording medium of claim 1, wherein the extracting extracts the external variable based on a given condition and the execution log.

3. The computer readable recording medium of claim 1, wherein the calculation of the second parameter accumulates the power consumption per instruction in the target module.

4. The computer readable recording medium of claim 1, wherein: the calculation of the first parameter calculates the first parameter in the target module and the first parameter in a module called by the target module; the calculation of the second parameter calculates the second parameter in the target module and a second parameter in the module called by the target module; and the evaluating outputs the evaluation result of the target module and an evaluation result of the module called by the target module.

5. A method of evaluating an evaluation target program, comprising:
    extracting an external variable used by a target module of the evaluation target program;
    calculating a first parameter indicating an impact size of the target module of the evaluation target program on outside of the target module, based on an execution log of the evaluation target module;
    calculating a second parameter regarding a power consumption by executing the target module based on the execution log; and
    evaluating the target module based on the first and second parameters and outputting an evaluation result,
    wherein the execution log is generated by:
        acquiring a target address per instruction by executing the evaluation target program before the calculation of the first parameter,
        detecting an instruction of writing or reading the external variable based on the instruction and a condition of the external variable set as the target address of the instruction, and
        generating the execution log including the detection of the writing or reading to the external variable, and
    calculating of the first parameter accumulates a given additional value set per variable type per a write or read instruction of the external variable and sets an accumulation result as the first parameter of the target module.

6. The method of claim 5, wherein the extracting extracts the external variable based upon a given condition and the execution log.

7. The method of claim 5, wherein: the calculation of the second parameter accumulates the power consumption per instruction in the target module.

8. The method of claim 5, wherein: the calculation of the first parameter calculates the first parameter in the target module and the first parameter in a module called by the target module; the calculation of the second parameter calculates the second parameter in the target module and the second parameter in the module called by the target module; and the evaluating outputs the evaluation result of the target module and an evaluation result of the module called by the target module.

* * * * *